United States Patent
Jagtap et al.

(10) Patent No.: US 12,510,290 B2
(45) Date of Patent: Dec. 30, 2025

(54) MANUAL DEFROST MECHANISM

(71) Applicant: Robertshaw Controls Private Limited, Pune Maharashtra (IN)

(72) Inventors: Vitthal Jagtap, Pimpri Pune-Pin Maharashtra (IN); Ashok Lokhande, Bhosari Pune-Pin Maharashtra (IN); Giovanni Cerizza, Lodi (IT)

(73) Assignee: ROBERTSHAW CONTROLS PRIVATE LIMITED, Maharashtra (IN)

( * ) Notice: Subject to any disclaimer, the term of this patent is extended or adjusted under 35 U.S.C. 154(b) by 0 days.

(21) Appl. No.: 17/908,611

(22) PCT Filed: Mar. 3, 2021

(86) PCT No.: PCT/IB2021/051753
§ 371 (c)(1),
(2) Date: Sep. 1, 2022

(87) PCT Pub. No.: WO2021/176365
PCT Pub. Date: Sep. 10, 2021

(65) Prior Publication Data
US 2023/0119198 A1    Apr. 20, 2023

(30) Foreign Application Priority Data
Mar. 3, 2020   (IN) .............................. 202021009086

(51) Int. Cl.
*F25D 21/00*   (2006.01)
(52) U.S. Cl.
CPC .................. *F25D 21/004* (2013.01)
(58) Field of Classification Search
CPC . F25B 2700/11; G05D 23/275; G05D 23/125; H01H 37/38; H01H 37/22;
(Continued)

(56) References Cited

U.S. PATENT DOCUMENTS

| | | | | |
|---|---|---|---|---|
| 3,320,386 A | * | 5/1967 | Liebermann | F25B 13/00 337/320 |
| 6,819,216 B2 | * | 11/2004 | Onishi | G05D 23/27537 337/306 |
| 7,170,388 B2 | * | 1/2007 | Nakajima | H01H 37/22 337/321 |

FOREIGN PATENT DOCUMENTS

| | | |
|---|---|---|
| JP | H01302626 A | 12/1989 |
| JP | H02195622 A | 8/1990 |
| WO | 2006013759 A1 | 2/2006 |

OTHER PUBLICATIONS

Int'l Search Report and Written Opinion issued Jul. 1, 2021 in Int'l Application No. PCT/IB2021/051753.

* cited by examiner

*Primary Examiner* — Jianying C Atkisson
*Assistant Examiner* — Meraj A Shaikh
(74) *Attorney, Agent, or Firm* — Panitch Scwharze Belisario & Nadel LLP

(57) ABSTRACT

A defrost mechanism which includes a first link cooperating with the actuating pin defined by a first end having a pivot and a second end fastened with a bellow lever, a second link defining a third end pivotably supported in said pivot and a fourth end slidably engaged in an adjusting lever and a switch configured to cut off power supply of the refrigerator, said switch forming a part of the electrical circuit supplying power to the refrigerator, said switch configured to be operated by the manual actuation of the actuating pin. The defrost mechanism offers simplicity of construction having less parts and reduces costs involved in manufacturing.

10 Claims, 6 Drawing Sheets

(58) Field of Classification Search
CPC ........ H01H 37/28; H01H 37/26; H01H 37/18; H01H 37/60; H01H 43/125; H01H 89/04; H01H 35/32; H01H 35/265
USPC .................................. 62/209, 149, 129, 132
See application file for complete search history.

Figure 1 – PRIOR ART

MANUAL DEFROST MECHANISM

CROSS-REFERENCE TO RELATED APPLICATIONS

This application is a Section 371 of International Application No. PCT/IB2021/051753, filed Mar. 3, 2021, which was published in the English language on Sep. 10, 2021, under International Publication No. WO 2021/176365 A1, which claims priority under 35 U.S.C. § 119 (b) to Indian Application No. 202021009086, filed Mar. 3, 2020, the disclosures of each of which are incorporated herein by reference.

FIELD

The present disclosure relates to a manual defrost mechanism used in domestic refrigerators. The disclosure also relates to a thermostat for a refrigerator that uses the defrost mechanism.

BACKGROUND

The background information herein below relates to the present disclosure but is not necessarily prior art.

In domestic refrigerators, frost is formed around the coils as well as in and around the freezer cabinet that is surrounded with evaporator coils, due to humidity on the outside and due to water vapour released by the foodstuff stored therein. Frost formed on the evaporator coils acts as an insulator and thus lowers the efficiency of cooling of the evaporator coils of the refrigerator. This frost needs to be removed periodically to optimize cooling effect and to save energy.

Defrosting in refrigerators can be implemented automatically and periodically, or can be done manually too. Automatic defrosting is done by heating the evaporator coils, typically using a defrost heating element.

In a market where the atmospheric humidity level is high, a defrost mechanism is typically employed in the thermostat of the refrigeration system, and the final user is obliged to run a periodical manual activation of the defrost mechanism. To realize the manual defrost function, the hitherto known defrost mechanism requires a relatively larger number of components, typically 7 to 10. This affects the repeatability in the switching ON operation of the refrigerator after defrosting. Further, the increased number of components results in increase in the cost of the thermostat, as well as makes the manufacturing of the thermostat complex.

There is, therefore, felt a need of a defrost mechanism in a thermostat of a refrigeration system to tackle the aforementioned problems.

Objects

Some of the objects of the present disclosure, which at least one embodiment herein satisfies, are as follows.

An object of the present disclosure is to provide a defrost mechanism in a thermostat of a refrigeration system that has relatively less number of components.

Another object of the present disclosure is to provide a defrost mechanism in a thermostat of a refrigeration system that is easy to manufacture.

Yet another object of the present disclosure is to provide a defrost mechanism in a thermostat of a refrigeration system that is relatively less expensive.

Yet another object of the present disclosure is to provide a thermostat for a refrigerator provided with an improved defrost mechanism.

Other objects and advantages of the present disclosure will be more apparent from the following description, which is not intended to limit the scope of the present disclosure.

SUMMARY

The present disclosure discloses a defrost mechanism of a refrigerator thermostat. The defrost mechanism is configured to be actuated by an actuating pin. The defrost mechanism comprises a first link, a second link and a switch. The first link cooperates with the actuating pin that is defined by a first end having a pivot and a second end. A bellow lever is fastened to the second end. The second link is defined by a third end pivotably supported in the pivot and a fourth end. An adjusting lever is engaged with the fourth end. The switch forms a part of the electrical circuit supplying power to the refrigerator. The switch is configured to be operated by the manual actuation of the actuating pin via the first link or the second link and the bellow lever, to cut-off power supply of the refrigerator.

Preferably, the defrost mechanism includes a spring attached between the bellow lever and the adjusting lever to facilitate snap action of the first link and the second link.

Further, a temperature adjustment screw is provided on the adjusting lever. The temperature adjustment screw is configured to limit linear displacement of the fourth end of the second link by adjusting tension exerted in the spring.

In an embodiment, the spring is a coil spring.

In an embodiment, the adjusting lever is slidably engaged with the fourth end.

BRIEF DESCRIPTION OF THE ACCOMPANYING DRAWING

The defrost mechanism in a thermostat of a refrigeration system of the present disclosure will now be described with the help of the accompanying drawing, in which.

LIST OF REFERENCE NUMERALS

Figure 1:
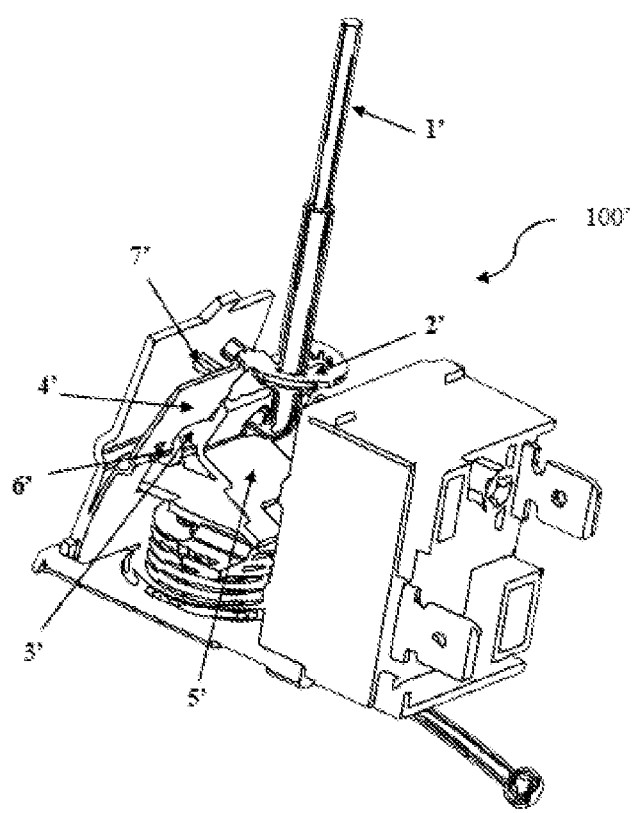
FIG. 1 shows an isometric view of a defrost mechanism of a thermostat of prior art.
Figure 2:
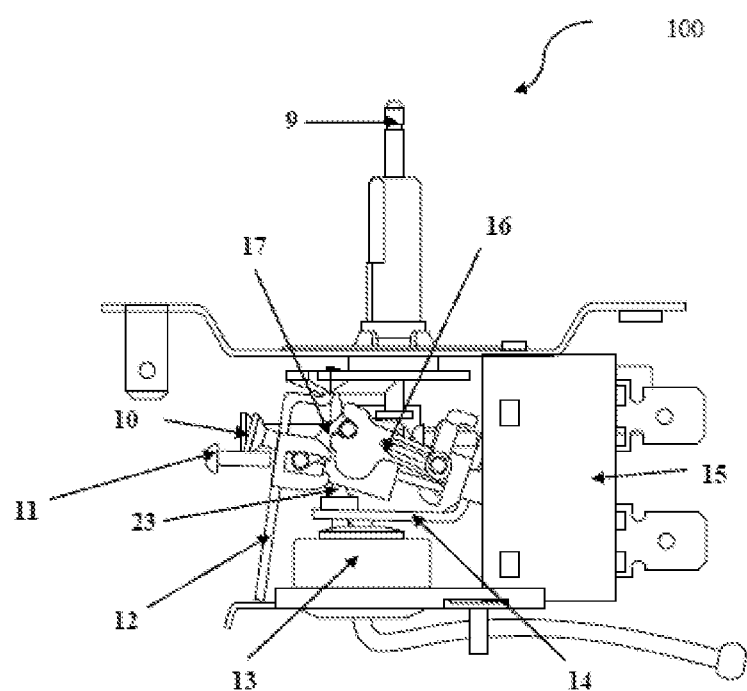
FIG. 2 illustrates a defrost mechanism of a thermostat, in accordance with an embodiment of the present disclosure.
Figure 3:
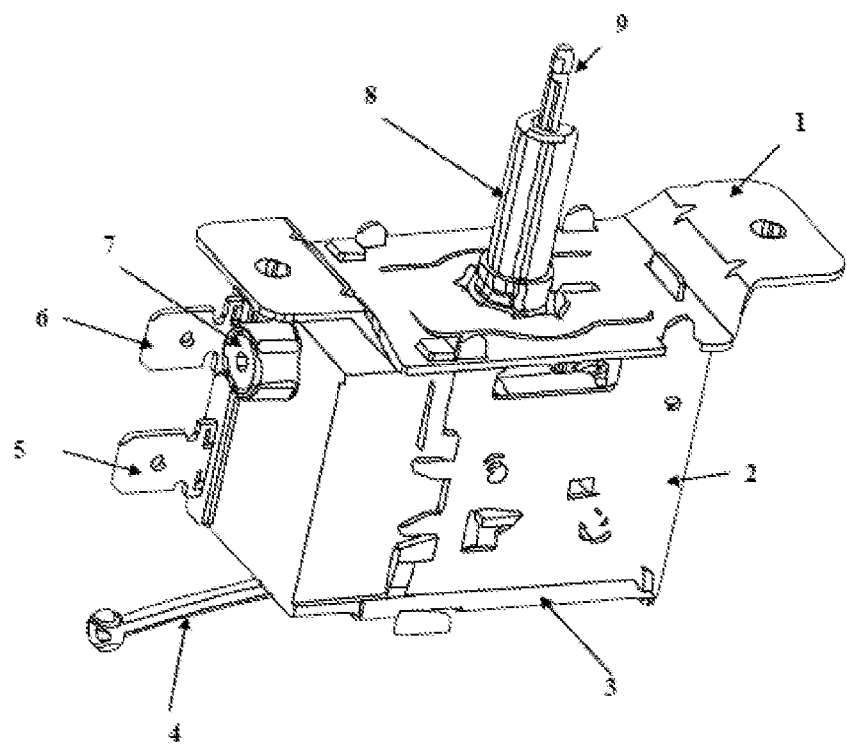
FIG. 3 shows an isometric view of the thermostat of FIG. 2.
Figure 4:
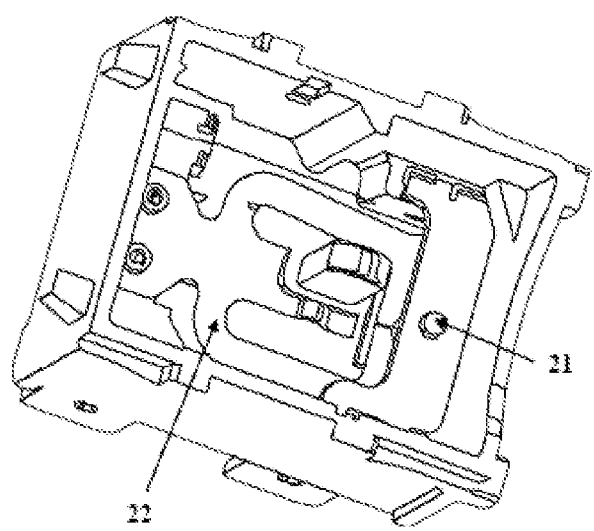
FIG. 4 shows a side view of the thermostat of FIG. 2.
Figure 5:
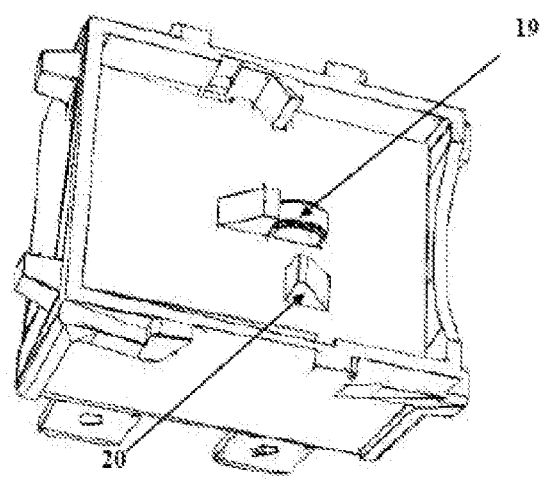
FIG. 5 shows another isometric view of the thermostat of FIG. 2 showing a switch and a switch base cover.
Figure 6:
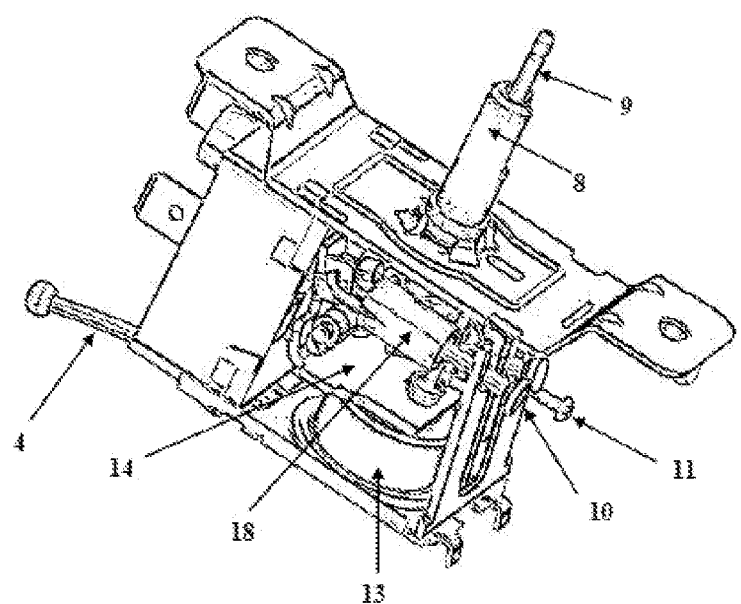
FIG. 6 shows another isometric view of the thermostat of FIG. 2 showing a spring of the defrost mechanism.

1'—actuating pin of prior art
2'—circlip of prior art
3'—roller of prior art
4'—adjusting lever of prior art
5'—link of prior art
6'—roller pin of prior art
7'—defrost screw of prior art
1—mounting plate of the present disclosure
2—frame of the present disclosure
3—bellow cup of the present disclosure
4—capillary of the present disclosure
5—second terminal of the present disclosure
6—third terminal of the present disclosure 7—first screw of the present disclosure
8—cam of the present disclosure
9—actuating pin of the present disclosure
10—second screw of the present disclosure
11—temperature adjustment screw of the present disclosure
12—adjusting lever of the present disclosure
13—bellow of the present disclosure
14—bellow lever of the present disclosure
15—switch base of the present disclosure
16—first link of the present disclosure
17—second link of the present disclosure
18—spring of the present disclosure
19—switch of the present disclosure
20—switch base cover of the present disclosure
21—q-blade assembly of the present disclosure
22—contact of switch 19 of the present disclosure
23—rod of the present disclosure
100—defrost mechanism of the present disclosure

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a", "an" and "the" may be intended to include the plural forms as well, unless the context clearly suggests otherwise. The terms "comprises", "comprising", "including" and "having" are open-ended transitional phrases and therefore specify the presence of stated features, elements, modules, units and/or components, but do not forbid the presence or addition of one or more other features, elements, components, and/or groups thereof. The particular order of steps disclosed in the method and process of the present disclosure is not to be construed as necessarily requiring their performance as described or illustrated. It is also to be understood that additional or alternative steps may be employed.

When an element is referred to as being "mounted on", "engaged to", "connected to" or "coupled to" another element, it may be directly on, engaged, connected or coupled to the other element. As used herein, the term "and/or" includes any and all combinations of one or more of the associated listed elements.

Terms such as "inner", "outer", "beneath", "below", "lower", "above", "upper" and the like, may be used in the present disclosure to describe relationships between different elements as depicted from the figures.

Referring to the FIG. 1, a typical defrost mechanism 100' of a thermostat of a domestic refrigerator is shown comprising an actuating pin 1', a circlip 2', a roller 3', an adjusting lever 4', a link 5', a roller pin 6', a defrost screw 7' and a spring (not shown in any figures). The actuating pin 1' extends in an operative vertical direction of the thermostat with its lower end secured to the link 5'. The link 5' is in the form of a plate supported in a switch box of the thermostat. The roller 3' is supported on a roller pin 6' mounted on the adjusting lever 4'. The adjusting lever 4' acts as a spring which is in the form of a plate when subjected to bending loads. The defrost screw 7' adjusts the tension in the adjusting lever 4' on account of bending of the adjusting lever 4'. The working of the mechanism 100' will now be explained. To manually realize the defrosting function of the mechanism 100', the actuating pin 1' is pressed, which causes the actuating pin 1' to push on the link 5'. This lowers the link 5' to a point when the edge of the link 5' is obstructed by the roller 3' causing a projecting part of the link 5' to exert a compressive force on a bellow located below the projecting part of the link 5'. A switch mounted on the switch base gets pressed leading to power supply cut off to the compressor. Thus, cooling of the space in the refrigerator is stopped. However, the mechanism 100' of the prior art involves usage of a large number of components to effect the manual defrost function. This poses difficulties in assembly of components as well as increases the manufacturing costs involved therein. Moreover, a roller arrangement is incorporated which necessitates the need of an additional pin for mounting the roller, which ultimately results in increased friction and wear among the assembled parts. In addition, the adjusting lever 4' is in the form of a plate which has to undergo bending, further complicating the mechanism 100'. A mechanism of the present disclosure has been disclosed which presents a solution for addressing the aforementioned problems of the prior art.

Referring to FIGS. 2-6, a defrost mechanism 100 (hereinafter referred to as mechanism 100) of a domestic refrigerator is shown. The mechanism 100 comprises a first link 16 and a second link 17 that are connected together pivotably. A first end of the first link 16 is configured with a pivot while the second end of the first link 16 is configured to be supported by a bellow lever 14. A first end of the second link 17 is configured to be pivotably supported by the pivot, while a second end of the second link 17 is configured to be slidably supported in a slot contained on the adjusting lever 12. An actuating pin 9 is configured to be displaced vertically, and is positioned within the mechanism 100 such that one of its ends is configured to be manually operated by a user, while its other end is configured to be in contact with a surface of the first link 16. A temperature adjustment screw 11 is disposed on the outside surface of the adjusting lever 12, and is configured to alter displacement limit of the second end of the second link 17.

A bellow cup 3, a capillary 4 and a bellow 13 provide feedback of temperature of the evaporator and thus form a closed loop system for handling refrigerant inside the evaporator. As the temperature of the refrigerant increases, the gas inside the bellow 13 expands and as a result the pressure inside the bellow 13 increases. This causes the bellow 13 to exert a force on the bellow lever 14. The bellow lever 14 is pivoted on a frame 2 which forms a casing of the thermostat. The bellow lever 14 touches the operative top surface of the bellow 13 and is firmly biased against the operative top surface of the bellow 13 by a spring 18. The spring 18 is disposed between the adjusting lever 12 and the bellow lever 14 to facilitate resilient deformation between the adjusting lever 12 and the bellow lever 14. The bellow lever 14 is connected to a switch 19. Change in pressure inside the bellow 13 due to a change in temperature of the evaporator coil causes displacement of the switch 19 through the bellow lever 14. The switch 19 switches ON or switches OFF the electric current supply to the compressor through a first terminal 5 and a second terminal 6. A mounting plate 1 lies on a top end of the thermostat. The frame 2 is supported by the plate 1. A screw 7 is mounted on a switch base 15 that is supported by the mounting plate 1. A switch base cover 20 is provided on the switch base 15 to facilitate providing of a cover to the switch base 15. A cam 8 is provided concentric to the actuating pin 9 and extends vertically to maintain contact with a rod 23. One end of the rod 23 is connected to the bottom of the cam 8 while its other end rests on the bellow 13. The rod 23 passes through a hole inside the bellow lever 14, and has a variable cross section along its span. The rod 23 is configured to transfer the vertical displacement of the bellow lever 14 to the bottom of the cam 8. A second screw 10 is provided on the adjusting lever 12 to alter the tension in the spring 18. The thermostat of the present disclosure further includes a q-blade assembly 21 and a contact 22 of the switch 19.

The working of the mechanism 100 will now be described referring to the FIGS. 1-5. To actuate the defrost mechanism 100, the user pushes on to the actuating pin 9 from the top which causes the first link 16 and the second link 17 to be tilted downwards. Downward rotation of first link 16 moves the second end of the second link 17 operatively backward in the slot provided on the adjusting lever 12. This causes the adjusting lever 12 to be displaced away from the second end of the second link 17. Thus, the spring 18 in connection with the adjusting lever 12 is deformed, and thus energy of deformation is stored in the spring 18. Displacement of the second link 17 increases the force exerted by the spring 18 on the bellow lever 14. This continues as long as the angle between the first link 16 and the second link 17 is less than 180 degrees the spring 18. However, when the first link 16 and the second link 17 are pushed further by the actuating pin 9, the angle between the first link 16 and the second link 17 increases beyond 180 degrees, and the spring force no longer resists the downward tilting of the first link 16 and the second link 17. Rotation of the first link 16 and the second link 17 in the downward direction is permitted as long as the bottom surface of the first link 16 comes in contacts with the bellow lever 14. Due to continued application of force on the actuating pin 9 by the user, the bellow lever 14 exerts a pressing force on the switch 19 mounted on the switch base cover 20. This causes switching OFF of the compressor. Also, the thermostat is switched OFF. The cooling action inside the refrigerator is stopped and therefore defrosting takes place.

To switch ON the thermostat for resumption of cooling action inside the refrigerator after completion of the defrosting action, the first link 16 and the second link 17 are required to be moved vertically upward again. This will happen when the bellow lever 14 moves up due to high pressure in the bellow 13 exerted by the expanding gas due to increase in the temperature of the evaporator coil. The bottom surface of the first link 16, that is resting on the bellow lever 14, is then pushed vertically upwards. As the first link 16 and the second link 17 are pushed to be tilted upwards beyond 180 degrees, the actuating pin 9 is reset to its original position. Also, the thermostat is then caused to be switched ON once again and cooling action of the refrigerator resumes. This completes the defrosting cycle.

Advantageously, the snap action of the manual defrost mechanism 100 of the thermostat of the present disclosure is realized using minimum number of components, i.e., the first link 16 and the second link 17, as compared to the roller 3', adjusting lever 4' and the roller 5' of the prior art. Also, the construction is simplified. The operation becomes reliable and repeatability in the switching ON operation of the refrigerator after defrosting is enhanced. The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

Technical Advancements

The present disclosure described herein above has several technical advantages including, but not limited to, the realization of a defrost mechanism for a refrigerator that:
   offers ease in manufacturing;
   requires less number of parts and hence eliminates complexity of construction; and
   offers reduced cost of expenditure;

The foregoing disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A manual defrost mechanism (100) of a thermostat for a refrigerator, said defrost mechanism (100) configured to be actuated by an actuating pin (9), said defrost mechanism (100) comprising:
   a first link (16) cooperating with the actuating pin (9) defined by a first end having a pivot and a second end, a bellow lever (14) fastened to said second end;
   a second link (17) defined by a third end pivotably supported in said pivot and a fourth end, an adjusting lever (12) engaged with said fourth end;

a switch (19) forming a part of an electrical circuit supplying power to the refrigerator, said switch (19) configured to be operated by a manual actuation of the actuating pin (9) via said first link (16) or said second link (17) and said bellow lever (14), to cut-off power supply of the refrigerator; and a single spring (18) attached between said bellow lever (14) and said adjusting lever (12) to facilitate snap action of said first link (16) and said second link (17), wherein the bellow lever (14) touches an operative top surface of a bellow (13) and is firmly biased against the operative top surface of the bellow (13) by said single spring (18), wherein a downward rotation of the first link (16) and the second link (17) and a continuous application of force through the actuating pin (9) causes a switching OFF of the thermostat and a vertically upward movement of first link (16) and second link (17) causes a turning ON of the thermostat, due to an action of the bellow lever (14) moving up due to high pressure in the bellow (13) exerted by expanding gas due to an increase in a temperature of an evaporator coil of the refrigerator.

2. The manual defrost mechanism (100) as claimed in claim 1, wherein a temperature adjustment screw (11) is provided on said adjusting lever (12), said temperature adjustment screw (11) configured to limit linear displacement of said fourth end (17b) of said second link (17) by adjusting tension exerted in said spring (18).

3. The manual defrost mechanism (100) as claimed in claim 1, wherein said spring (18) is a coil spring.

4. The manual defrost mechanism (100) as claimed in claim 1, wherein said adjusting lever (12) is slidably engaged with said fourth end.

5. The manual defrost mechanism (100) as claimed in claim 1, wherein a tension of the spring (18) is regulated by a screw (10) in the adjusting lever (12).

6. A thermostat for a refrigerator, the thermostat comprising a manual defrost mechanism (100) according to claim 1.

7. A thermostat for a refrigerator, the thermostat comprising a manual defrost mechanism (100) according to claim 2.

8. A thermostat for a refrigerator, the thermostat comprising a manual defrost mechanism (100) according to claim 3.

9. A thermostat for a refrigerator, the thermostat comprising a manual defrost mechanism (100) according to claim 4.

10. A thermostat for a refrigerator, the thermostat comprising a manual defrost mechanism (100) according to claim 5.

* * * * *